2,884,412

PHOSPHATE-MODIFIED STARCHES AND PREPARATION

Hans Neukom, Chicago, Ill., assignor to International Minerals & Chemical Corporation, a corporation of New York No Drawing. Application September 4, 1953
Serial No. 378,666

17 Claims. (Cl. 260—233.5)

The instant invention relates to modified starches. More particularly, it relates to the production of starch phosphates.

Starch, which is sold as a white powder, is utilized commercially as an additive for numerous products and imparts desired physical properties to such products, for example the property of adhesiveness, water retention, viscosity or gelation. Because of its properties, starch is added to food products as a thickener, a stabilizer, a binder, or an extender. It is employed as a fiber coating for textiles, as a sizing agent in paper, as a slime inhibitor in ore flotation operations, and for many other uses.

Modified starch pastes are frequently employed instead of starch because the properties of certain modified starches are superior to those of untreated starch.

Starch phosphates, which are chemically modified starches, have been prepared by the reaction of starch and phosphorus oxychloride in the presence of a hydrogen chloride acceptor, usually pyridine. By this method and its modifications, the starch phosphates obtained are usually highly degraded or are cross-linked insoluble products. These processes are also unsatisfactory from a commercial standpoint because the procedures are complex and expensive to carry out.

It is an object of the instant invention to provide improved processes for the modification of starches.

It is a further object of the instant invention to provide processes for the production of improved modified starches.

It is a further object of the instant invention to provide improved processes for the production of starch phosphates.

These and other objects of the instant invention will become more apparent as hereinafter described.

It has been discovered that certain phosphate salts react with starch when heated at an elevated temperature, that is a temperature between about 120° C. and about 175° C.

Dry, ungelatinized starch is heated with one or more phosphates. In one embodiment of the instant invention the phosphate is introduced into the starch granule by soaking the starch in an aqueous solution of the phosphate. The resulting soaked starch granules are then separated from the solution, the excess surface moisture is removed, and the resulting material is heated at a temperature between about 120° C. and about 175° C. The heating is carried out either at atmospheric pressure or under vacuum. Although the reaction can be carried out at temperatures between about 120° C. and about 175° C., the reaction temperature is preferably between about 130° C. and about 170° C. Higher temperatures than about 175° C. are generally avoided because dextrinization of the starch occurs at higher temperatures.

In carrying out the instant invention, the phosphate salt or salts are present in an aqueous solution having a pH between about 3.0 and about 10.0. The phosphates which may be employed include sodium, potassium, and lithium phosphates. The phosphate salt dissolved in water and having a pH between about 3.0 and about 10.0, or a combination of phosphate salts dissolved in water in such proportion that the resulting solution has a pH between about 3.0 and about 10.0, is reacted with the starch. For example, monosodium phosphate and disodium phosphate are combined in an aqueous solution in such proportion that the resulting phosphate solution has a pH between about 3.0 and about 10.0. The phosphate salts may be formed in situ in the solution. For example, the phosphate solution is prepared by dissolving a basic phosphate salt, such as trisodium phosphate, in water and adjusting the pH of the solution with phosphoric acid to between about 3.0 and about 10.0. In another embodiment, an aqueous solution of an acidic phosphate salt or phosphoric acid is neutralized with sodium hydroxide, potassium hydroxide, or lithium hydroxide.

The amount of phosphate introduced into the starch molecule is controlled by increasing or decreasing the concentration of the phosphate in the solution. Generally between about 3 and about 4 parts of starch are treated with between about 5 and about 8 parts of solution containing between about 2.5% and about 30% concentration of phosphate, and having a pH between about 3.0 and about 10.0, preferably between about 5.5 and about 7.5.

In a more specific embodiment of the instant invention, between about 3 and about 4 parts of starch are admixed with between about 5 and about 8 parts of phosphate solution. The solution is prepared by dissolving an alkali metal phosphate salt or combination of salts, such as monosodium phosphate monohydrate and disodium phosphate heptahydrate or dodecahydrate in water, and if the pH is not in the range of between about 5.5 and about 7.5, adjusting the pH of the resulting solution to this pH range with an appropriate neutralizing agent, such as phosphoric acid or an alkali metal hydroxide. The phosphate solution preferably contains between about 5.0% and about 20% phosphate salt.

The resulting slurry is agitated or stirred for at least about 5 minutes. Usually about 10 minutes of stirring is sufficient for the starch granules to become soaked with the phosphate solution.

The swollen granules are separated from the phosphate solution, for example by filtration, and excess surface moisture is preferably removed, for example by drying in the air or heating at a temperature below the point at which starch gelatinizes, for example at a temperature below about 45° C., depending upon the particular starch. The resulting granules, which generally contain between about 8% and about 15% moisture content, are then heated at a temperature between about 120° C. and about 170° C. for between about 1 hour and about 15 hours. Longer periods of heating are employed when the lower temperatures in the above range are used. Generally about 4 hours heating is sufficient time for the reaction to proceed to substantial completion when a temperature between about 130° C. and about 155° C. is employed. The modified starch generally contains at least about 1.0% phosphorus.

The instant process is applicable to root starches, such as potato starch, cereal starches, such as cornstarch, wheat starch, etc., and their modification products, for example acid modified, oxidized, cross-linked starches or starch derivatives.

The starch phosphates prepared in accordance with the instant invention may be altered in properties by controlling reaction conditions and the amount of phosphorus introduced into the starch molecule. The molecule size of the starch phosphates can be varied within a wide range by carrying out the phosphorylation under conditions which promote or inhibit degradation reactions.

Degradation of the starch is promoted by increasing the amount of phosphate or by employing a higher temperature. In this way a thick or a thin boiling starch phosphate or a dextrin phosphate is produced.

As a specific embodiment of the instant invention, about ½ mole of monosodium phosphate monohydrate is dissolved in water and is mixed with about 1 mole of granular wheat starch. The resulting slurry is agitated or stirred for between about 5 minutes and about 60 minutes, generally for about 10 minutes. Solid material is separated from the resulting slurry, for example by filtration, and the solid material is broken up and dried in the atmosphere. The dried material is then heated to a temperature between about 130° C. and about 170° C. for between about 1 hour and about 15 hours, preferably for about 4 hours.

The starch phosphates obtained by the practice of the instant invention have a number of properties which make them more useful than unmodified starches. Some of the important properties of the instant starch phosphates are: their solubility (swelling) in cold water, their stability in the form of pastes on prolonged standing, their resistance to bacteriological attack, and their controlled variability of viscosity for different uses.

Generally, pastes prepared from cereal starches have a tendency to set to opaque unworkable gels when they cool. The starch phosphates prepared according to the instant process form stable pastes which do not gel upon standing. In addition, these pastes are much clearer than those prepared from corresponding unmodified starches.

Starch phosphate films may be cast from cooled solutions of the phosphates, and the films are transparent, flexible and water soluble.

Because of these properties of the starch phosphates, they are useful as sizing agents in the surface finishing of paper, as a beater additive prior to the paper mat formation in paper making, as a water loss inhibitor in oil well drilling muds, as a core binder in the preparation of foundry cores, and as a thickening agent in food products, such as soups, ice cream, puddings, mayonnaise, salad dressing, pie fillings, and the like.

The following examples are presented in order to afford a clearer understanding of the practice of the instant invention, but it is understood that they are illustrative only, and there is no intention to limit the invention thereto.

Example I

About 69 grams (½ mole) monosodium phosphate monohydrate was dissolved in about 251 grams of water. About 180 grams of wheat starch (1 mole) were added to the solution, and the resulting slurry was stirred for about 10 minutes. Swollen starch granules were separated from the solution by filtration, and the filter cake was broken up and dried in the air. The dried starch lumps were heated in a vacuum oven for about 3 hours at a temperature between about 135° C. and about 145° C. The product obtained was cold water swelling and gave a thin boiling clear solution when heated. It became turbid on cooling. After washing with alcohol, the product was analyzed and contained about 0.96% bound phosphorus and about 0.68% sodium.

Example II

About 193 grams (½ mole) disodium phosphate dodecahydrate was dissolved in about 127 grams of water. About 180 grams of wheat starch were added to the solution, and the resulting slurry was stirred for about 10 minutes and filtered. The filter cake was broken up, dried in the air, and the dried starch was heated for about 4 hours in a vacuum oven at a temperature between about 145° C. and about 152° C. The product formed a short paste when cooked in water and contained about 0.9% phosphorus and about 1.39% sodium.

Example III

About 34.5 grams (¼ mole) monosodium phosphate monohydrate and about 96 grams (¼ mole) of disodium phosphate dodecahydrate were dissolved in about 190 grams of water. About 180 grams of wheat starch were added to the solution, and the resulting slurry was stirred for about 10 minutes and was filtered. The filter cake was broken up, air dried, and heated in a vacuum oven for about 4 hours at a temperature between about 145° C. and about 152° C. The product obtained was cold water swelling and thick boiling, forming a clear viscous paste which was stable at about atmospheric temperature. The product contained about 1.63% bound phosphorus and about 1.78% sodium.

Example IV

About 180 grams of air dried phosphate modified wheat starch filter cake prepared as described in Example III was heated in an oven at a temperature between about 145° C. and about 165° C. The product obtained was cold water swelling and formed a thick paste at a concentration of about 5%. The paste prepared using this product did not set back to a gel upon cooling.

Example V

A starch phosphate was prepared from cornstarch by the method described in Example III. The product obtained was cold water swelling and formed a clear paste upon heating, which remained fluid and stable after cooling.

Having thus fully described and illustrated the character of the invention, what is desired to be secured and claimed by Letters Patent is:

1. A process for the preparation of a starch phosphate which comprises commingling ungelatinized starch with an aqueous solution containing at least about 2.5% by weight of at least one phosphate salt of an alkali metal and having a pH between about 3.0 and about 7.5, contacting said starch and said solution in a proportion and for a time sufficient to incorporate said phosphate salt in said starch in a quantity equivalent to at least about 1.0% by weight of phosphorus, removing unabsorbed liquid from the treated starch by drying at a temperature below the point at which the starch gelatinizes, and heating the dried starch at a temperature between about 120 and about 175° C. for a period of about 1 to about 15 hours.

2. The process of claim 1 wherein said aqueous phosphate salt solution has a pH between about 5.5 and about 7.5.

3. The process of claim 1 wherein said starch and said aqueous phosphate salt solution are contacted for a period of about 5 to about 60 minutes.

4. The process of claim 1 wherein said dried starch is heated at a temperature between about 130 and about 170° C.

5. The process of claim 1 wherein said dried starch is heated until the reaction has proceeded to substantial completion.

6. The process of claim 1 wherein the starch composition, after heat treatment, is washed with alcohol.

7. The process of claim 1 wherein said aqueous solution contains between about 2.5 and about 30% by weight of at least one phosphate salt of sodium.

8. The process of claim 7 wherein said salt is monosodium phosphate monohydrate.

9. The process of claim 7 wherein said salt is disodium phosphate dodecahydrate.

10. The process of claim 1 wherein the soaked starch, prior to heat treatment, is dried to a moisture content between about 8 and about 15% by weight at a temperature below the point at which the starch gelatinizes.

11. A process for the preparation of starch phosphates which comprises admixing ungelatinized wheat starch with an aqueous solution containing between about 2.5% and about 30% of at least one phosphate salt of sodium and having a pH between about 5.5 and about 7.5, agitating the resulting slurry for between about 5 minutes and about 60 minutes, drying the soaked starch to a moisture content between about 8 and about 15% by weight at a temperature below the point at which the starch gelatinizes, and heating the dried starch at a temperature between about 120° C. and about 170° C. for between about 1 hour and about 15 hours, whereby a starch phosphate composition is obtained containing phosphate in an amount equivalent to at least about 1.0% by weight of phosphorus, based on the original starch.

12. A process for the preparation of starch phosphates which comprises admixing ungelatinized cornstarch with an aqueous solution containing at least one phosphate salt of an alkali metal and having a pH between about 5.5 and about 7.5, agitating the resulting slurry for between about 5 minutes and about 60 minutes, drying the soaked starch to a moisture content between about 8 and about 15% by weight at a temperature below the point at which the starch gelatinizes, and heating the dried starch at a temperature between about 120° C. and about 170° C. for between about 1 hour and about 15 hours, whereby a starch phosphate composition is obtained containing phosphate in an amount equivalent to at least about 1.0% by weight of phosphorus, based on the original starch.

13. A process for the preparation of starch phosphates which comprises admixing between about 3 and about 4 parts by weight of ungelatinized starch and between about 5 and about 8 parts of an aqueous solution containing between about 2.5% and about 30% concentration of at least one phosphate salt of an alkali metal and having a pH between about 3.0 and about 7.5, agitating the resulting slurry for between about 5 minutes and about 60 minutes, separating the soaked starch from the liquid phase, drying the soaked starch to a moisture content between about 8 and about 15% by weight at a temperature below the point at which the starch gelatinizes, and heating the dried starch at a temperature between about 120° C. and about 175° C. for between about 1 hour and about 15 hours, whereby a starch phosphate composition is obtained containing phosphate in an amount equivalent to at least about 1.0% by weight of phosphorus, based on the original starch.

14. A process for the preparation of starch phosphates which comprises admixing between about 3 and about 4 parts by weight of ungelatinized starch and between about 5 and about 8 parts of an aqueous solution containing between about 5% and about 20% concentration of at least one phosphate salt of sodium and having a pH between about 5.5 and about 7.5, agitating the resulting slurry for between about 5 minutes and about 60 minutes, separating the soaked starch from the liquid phase, drying the soaked starch to a moisture content between about 8 and about 15% by weight at a temperature below the point at which the starch gelatinizes, and heating the dried starch at a temperature between about 120° C. and about 175° C. for between about 1 hour and about 15 hours, whereby a starch phosphate composition is obtained containing phosphate in an amount equivalent to at least about 1.0% by weight of phosphorus, based on the original starch.

15. A process for the preparation of starch phosphates which comprises admixing between about 3 and about 4 parts by weight of ungelatinized starch and between about 5 and about 8 parts of an aqueous solution containing between about 2.5% and about 30% concentration of monosodium phosphate monohydrate and disodium phosphate dodecahydrate and having a pH between about 5.5 and about 7.5, agitating the resulting slurry for between about 5 minutes and about 60 minutes, separating the soaked starch from the liquid phase, drying the soaked starch to a moisture content between about 8 and about 15% by weight at a temperature below the point at which the starch gelatinizes, and heating the dried starch at a temperature between about 120° C. and about 175° C. for between about 1 hour and about 15 hours, whereby a starch phosphate composition is obtained containing phosphate in an amount equivalent to at least about 1.0% by weight of phosphorus, based on the original starch.

16. A process for the preparation of a starch phosphate which comprises impregnating an ungelatinized starch with at least about 1.0 percent by weight, calculated as phosphorus, of at least one phosphate salt of an alkali metal in an aqueous solution of said salt having a pH between 3.0 and about 7.5, and heating the impregnated starch in the substantial absence of unabsorbed water at a temperature between about 120° and about 175° C. for a period of about 1 to about 15 hours.

17. An alkali metal phosphate-modified starch prepared by the method of claim 16 containing bound phosphate in a proportion equivalent to at least about 1 percent by weight of phosphorus.

References Cited in the file of this patent

UNITED STATES PATENTS

| | | |
|---|---|---|
| 2,171,796 | Kelling | Sept. 5, 1939 |
| 2,252,479 | Beyer | Aug. 12, 1941 |
| 2,328,537 | Felton et al. | Sept. 7, 1943 |
| 2,575,352 | Lohmar | Nov. 20, 1951 |
| 2,590,912 | Yarber | Apr. 1, 1952 |
| 2,806,026 | Evans | Sept. 10, 1957 |

FOREIGN PATENTS

| | | |
|---|---|---|
| 70,237 | Switzerland | Sept. 1, 1915 |